(12) United States Patent
Tione

(10) Patent No.: US 11,529,982 B2
(45) Date of Patent: Dec. 20, 2022

(54) VEHICLE CONTROL SYSTEM

(71) Applicant: FAIVELEY TRANSPORT ITALIA S.P.A., Piossasco (IT)

(72) Inventor: Roberto Tione, Lauriano (IT)

(73) Assignee: FAIVELEY TRANSPORT ITALIA S.P.A., Piossasco (IT)

( * ) Notice: Subject to any disclaimer, the term of this patent is extended or adjusted under 35 U.S.C. 154(b) by 107 days.

(21) Appl. No.: 16/990,191

(22) Filed: Aug. 11, 2020

(65) Prior Publication Data

US 2020/0369305 A1 Nov. 26, 2020

Related U.S. Application Data

(63) Continuation-in-part of application No. 16/090,362, filed as application No. PCT/IB2017/051887 on Apr. 3, 2017, now Pat. No. 10,780,904.

(30) Foreign Application Priority Data

Apr. 5, 2016 (IT) .......................... 102016000034535

(51) Int. Cl.
 *B61L 27/04* (2006.01)
(52) U.S. Cl.
 CPC ........... *B61L 27/04* (2013.01); *B61L 2201/00* (2013.01)
(58) Field of Classification Search
 CPC ........ B61L 27/04; B61L 3/10; B61L 2201/00; B61L 15/00; B61L 15/0081

(Continued)

(56) References Cited

U.S. PATENT DOCUMENTS 6,152,546 A * 11/2000 Daigle .................. B60T 8/1705
 303/151
2005/0189887 A1* 9/2005 Donnelly ................ B61C 15/14
 318/52

(Continued)

FOREIGN PATENT DOCUMENTS

CN 1845842 A * 10/2006 ............. B61C 15/14
CN 101213104 A * 7/2008 ................ B60L 3/10

(Continued)

OTHER PUBLICATIONS

Jin, et al.; "Tire-road friction estimation and traction control strategy for motorized electric vehicle"; 2017; PubMedCentral; pp. 1-18; https://www.ncbi.nlm.nih.gov/pmc/articles/PMC5491023/ (Year: 2017).*

(Continued)

*Primary Examiner* — Atul Trivedi
(74) *Attorney, Agent, or Firm* — Will Breeze; The Small Patent Law Group LLC

(57) ABSTRACT

A vehicle control system is provided for controlling adhesion of wheels to a route surface. The control system includes one or more processors configured to determine adhesion values representative of adhesion between the wheels of a vehicle and the route surface based on angular speeds of the wheels. The one or more processors are configured to generate a target slip value for the wheels that are coupled with at least two different axles of the vehicle by processing the adhesion values and modifying the target slip value continuously in time to maximize an average value of the adhesion values of the wheels. The one or more processors also are configured to control a torque applied to at least one of the axles based on the target slip value.

20 Claims, 9 Drawing Sheets

(58) Field of Classification Search
USPC .......................................................... 701/20
See application file for complete search history.

(56) References Cited

U.S. PATENT DOCUMENTS

| | | | | |
|---|---|---|---|---|
| 2007/0001629 A1* | 1/2007 | McGarry | ................. | B60L 3/102 |
| | | | | 318/52 |
| 2008/0116739 A1* | 5/2008 | Lang | ..................... | B60T 8/1705 |
| | | | | 303/15 |
| 2012/0277940 A1* | 11/2012 | Kumar | ................... | B61L 27/16 |
| | | | | 701/19 |
| 2013/0082626 A1* | 4/2013 | Daigle | .................... | B60L 50/13 |
| | | | | 318/52 |
| 2013/0320900 A1* | 12/2013 | Daigle | .................... | B60L 50/13 |
| | | | | 318/434 |
| 2014/0074328 A1* | 3/2014 | Schaffler | ................ | B60T 8/175 |
| | | | | 903/902 |
| 2014/0297141 A1* | 10/2014 | Nihanda | ............ | B60K 23/0808 |
| | | | | 701/58 |
| 2016/0010574 A1* | 1/2016 | Kumar | ...................... | B60L 3/12 |
| | | | | 701/104 |
| 2016/0264019 A1* | 9/2016 | Drako | .................. | B60K 17/356 |
| 2020/0369305 A1* | 11/2020 | Tione | ....................... | B61L 27/04 |
| 2021/0086623 A1* | 3/2021 | Yao | ................. | B60W 30/18172 |

FOREIGN PATENT DOCUMENTS

| | | | | |
|---|---|---|---|---|
| CN | 101557958 A | * | 10/2009 | ............. B62D 11/10 |
| CN | 106444373 A | * | 2/2017 | |
| WO | WO-2015136117 A1 | * | 9/2015 | ............. B60L 15/20 |

OTHER PUBLICATIONS

Amodeo, et al.; "Wheel Slip Control via Second-Order Sliding-Mode Generation"; 2010; IEEE Transactions on Intelligent Transportation Systems; vol. 11, No. 1; pp. 122-131; https://ieeexplore.ieee.org/document/5340526 (Year: 2010).*

* cited by examiner

VEHICLE CONTROL SYSTEM

CROSS-REFERENCE TO RELATED APPLICATIONS

This application is a continuation-in-part of U.S. patent application Ser. No. 16/090,362, filed on 1 Oct. 2018, and which is a national stage application, filed pursuant to 35 U.S.C. § 371, of International Patent Application No. PCT/IB2017/051887, filed 3 Apr. 2017, which claims priority to Italian Patent Application No. 102016000034535, filed on 5 Apr. 2016. The entire disclosures of these applications are incorporated herein by reference.

BACKGROUND

Technical Field

The inventive subject matter relates to controlling adhesion of wheels of a vehicle.

Discussion of Art

Wheels of a vehicle may slip on roads, tracks, or the like, when adhesion between the wheels and the surfaces of the roads, tracks, etc. decreases. With respect to rail vehicles, electronic systems are installed onboard modern rail vehicles that typically include wheel slide control subsystems. These subsystems are adapted to intervene both when the vehicle is in the traction phase and when the vehicle is in the braking phase. These subsystems can be referred to as anti-skid or anti-slide systems, or also WSP (Wheel Slide Protection) systems.

BRIEF DESCRIPTION

In one embodiment, a vehicle control system is provided for controlling adhesion of wheels to a route surface. The control system includes one or more processors configured to determine adhesion values representative of adhesion between the wheels of a vehicle and the route surface based on angular speeds of the wheels. The one or more processors are configured to generate a target slip value for the wheels that are coupled with at least two different axles of the vehicle by processing the adhesion values and modifying the target slip value continuously in time to maximize an average value of the adhesion values of the wheels. The one or more processors also are configured to control a torque applied to at least one of the axles based on the target slip value.

A method for controlling adhesion of wheels of a vehicle includes determining adhesion values representative of adhesion between wheels of a vehicle and a route surface based on angular speeds of the wheels and determining a target slip value for the wheels that are coupled with at least two different axles of the vehicle. The target slip value is determined based on the adhesion values that is determined. The method also includes controlling a torque applied to at least one of the axles based on the target slip value and continuously changing the target slip value as the vehicle moves based on changes in the adhesion values to maximize an average value of the adhesion values.

A system for controlling adhesion of wheels of a vehicle includes one or more processors configured to determine adhesion values representative of adhesion between wheels of a vehicle and a route surface based on angular speeds of the wheels. The one or more processors are configured to determine a target slip value for the wheels that are coupled with at least two different axles of the vehicle. The one or more processors are configured to determine the target slip value based on the adhesion values that is determined. The one or more processors are configured to control a torque applied to at least one of the axles based on the target slip value and to continuously change the target slip value as the vehicle moves based on changes in the adhesion values to maximize an average value of the adhesion values. The wheels include a leading wheel and a trailing wheel along a direction of movement of the vehicle. The one or more processors are configured to increase the target slip value associated with the leading wheel to clean the route surface with the leading wheel prior to travel of the trailing wheel.

The continuous change to the target slip value can include repeatedly changing the target slip value based on a sampling time of the system such that one or more intervals of time may exist between changes to the target slip value. The average value of the adhesion values can be maximized by increasing the average value to a designated or upper limit, where this limit can be less than a theoretical or maximum potential adhesion. For example, the maximized average value of adhesion may be an adhesion value that prevents the wheels from slipping but is less than a largest possible value of adhesion.

BRIEF DESCRIPTION OF THE DRAWINGS

The inventive subject matter may be understood from reading the following description of non-limiting embodiments, with reference to the attached drawings, wherein below.

DETAILED DESCRIPTION

Figure 1:
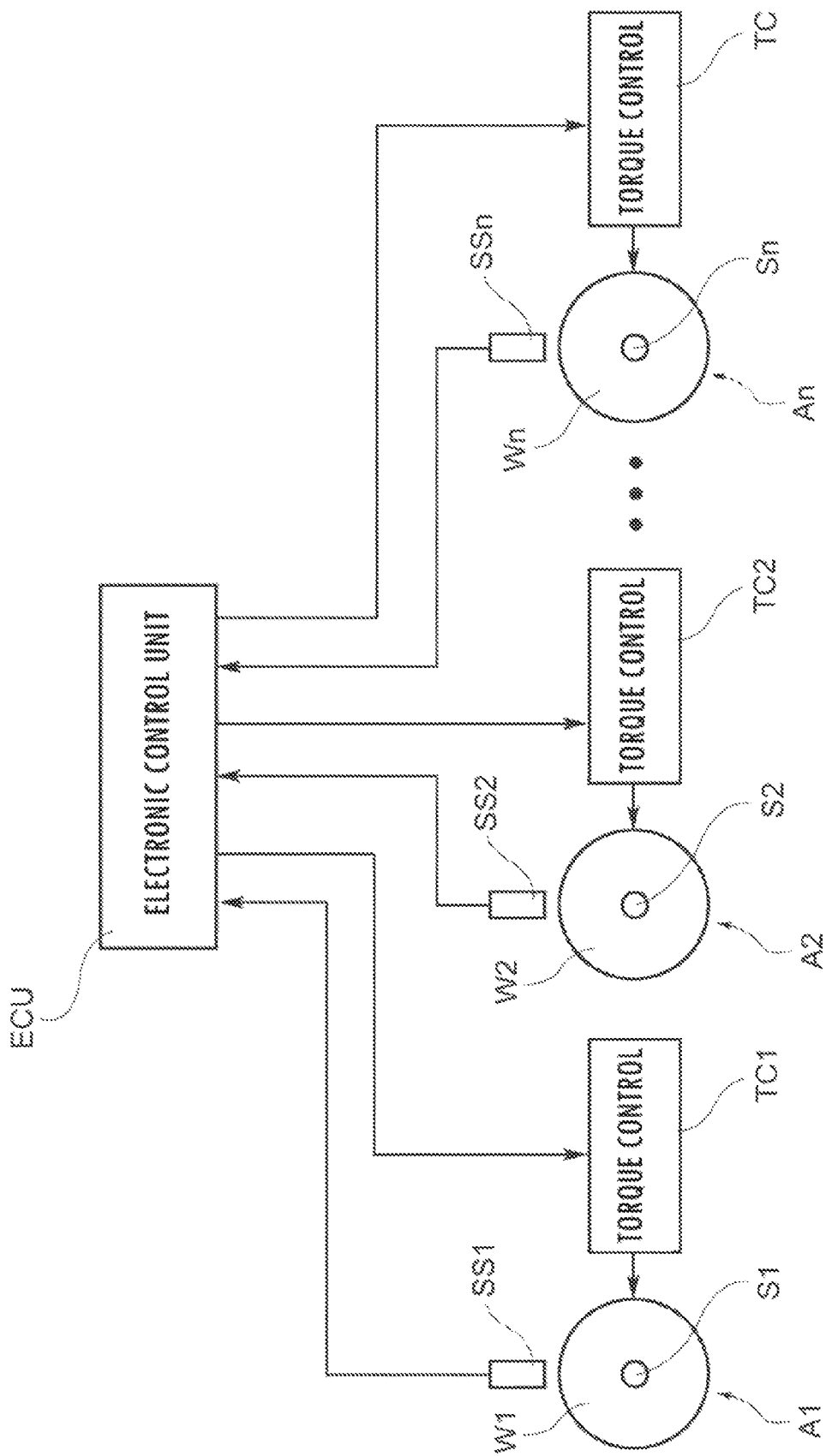
FIG. 1 is a block diagram of an anti-skid control system of the wheels of a vehicle.

One example a system for controlling the adhesion of the wheels is schematically represented in FIG. 1 of the accompanying drawings. This Figure illustrates a vehicle with n controlled axles A1, A2, ..., An. The axles A1, A2, ..., An comprise a respective shaft S1, S2, ..., Sn and a respective pair of wheels W1, W2, ..., Wn integral in rotation to the shaft. In the drawings, generally only one wheel of each axle is illustrated. The WSP system of FIG. 1 comprises an electronic control unit ECU, typically based on microprocessor architecture, that receives tachometer signals relating to the angular speed of each axle A1, A2, ... An from sensors SS1, SS2, ..., SSn respectively associated to these axles. The electronic control unit ECU is also connected to the torque control apparatuses TC1, TC2, ..., TCn, each associated to a respective axle A1, A2, ..., An.

The electronic control unit ECU is provided to operate a modulation of the torque applied to each axle according to a predetermined algorithm if, in the case of applying torque during traction or braking phase in a degraded adhesion situation, the wheels of one or more axles end up in a possible incipient slipping condition. Torque modulation is implemented in such a way as to prevent a total locking of the axles, possibly so as to bring each axle into a situation of controlled slipping in view of recovering adhesion and in any case for the entire duration of the degraded adhesion situation.

Figure 2:
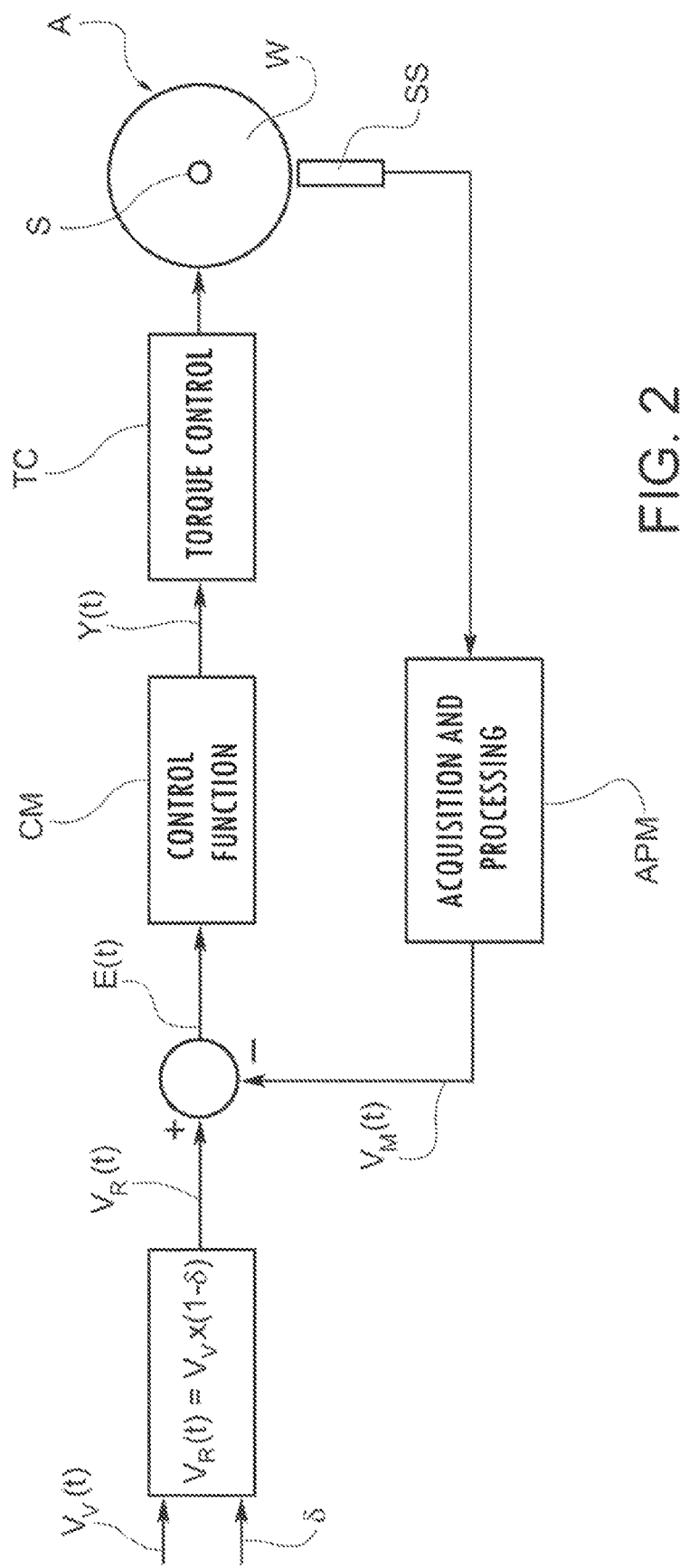
FIG. 2 is a block diagram of a closed loop control system of an axle's rotation speed.

FIG. 2 shows a block diagram illustrating an adhesion control/recovery system for an axle. The error or difference E(t) between the reference speed value VR(t) at which one wishes to slide the controlled axle A and the measured speed VM(t) detected by the associated sensor SS and conditioned by an acquisition and processing module APM is applied as an input signal to a control module CM, which outputs a drive signal Y(t) to the torque control apparatus TC associated with the axle A. The reference velocity VR(t) is obtained as a fraction of the instantaneous speed of the vehicle, for example, according to the expression:

$$V_s(t) = V_v(t) \cdot (1-\delta) \quad (1)$$

where $V_v(t)$ is the instantaneous (detected) speed of the vehicle, $\delta$ represents the relative slip of the axle A to be obtained during the slipping phase. The optimization over time of the relative slip value $\delta$ represents one of the objects of the inventive subject matter described herein.

Figure 3:
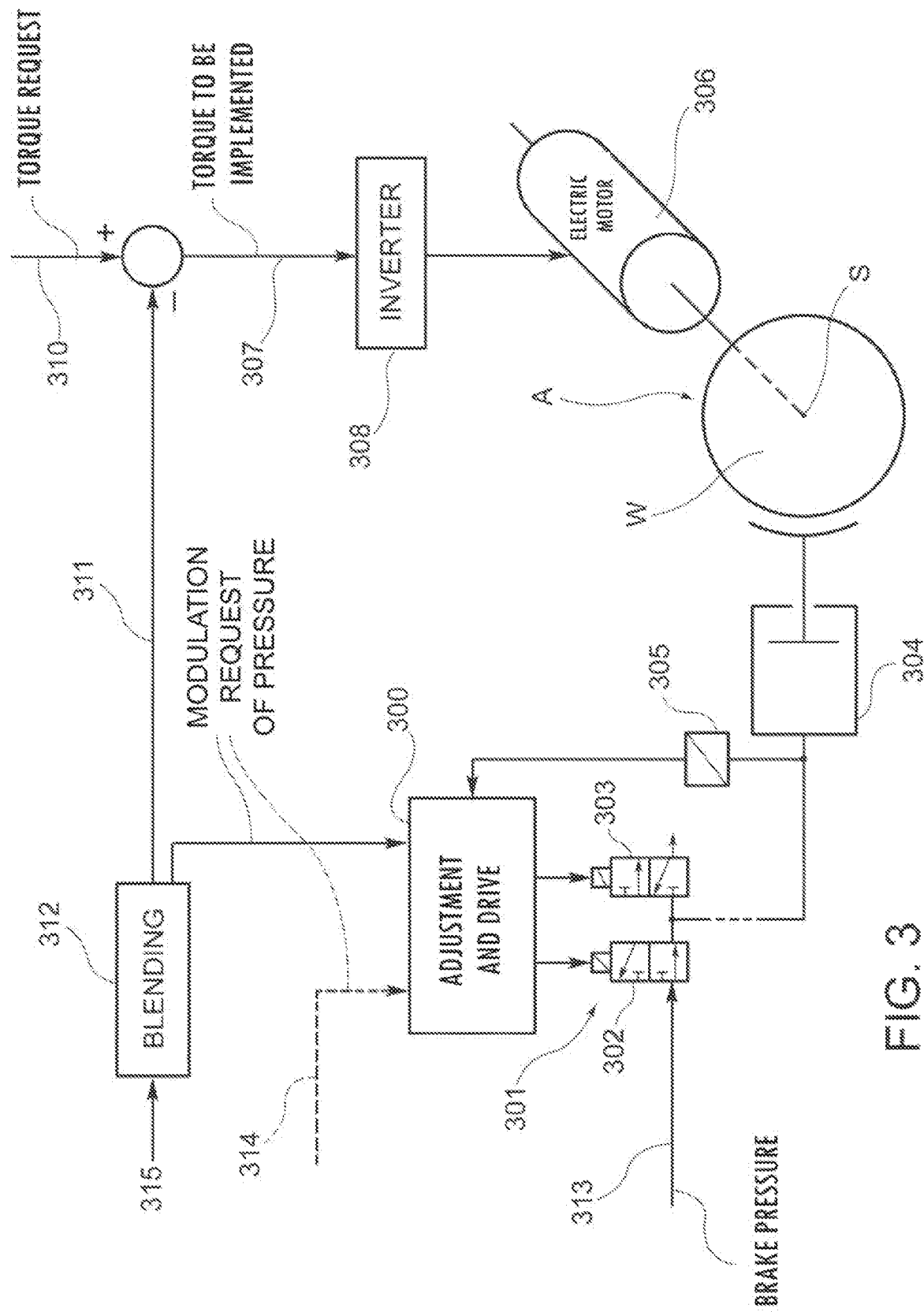
FIG. 3 is a diagram of a possible embodiment of an apparatus for controlling the torque applied to an axle.

FIG. 3 illustrates by way of non-limiting example a possible embodiment of the torque control apparatus TC. Such apparatus comprises an electronic adjustment and drive unit 300, which controls a solenoid valve unit 301 including a charging solenoid valve 302 and a discharging solenoid valve 303. In the embodiment illustrated, these solenoid valves are three-way valves with two positions. The solenoid valve 302 is normally open, and the solenoid valve 303 is normally closed. The output of the charging solenoid valve 302 is coupled to a brake cylinder 304 associated to the axle A.

Under the control of the electronic unit 300, the valve unit 301 allows to selectively reduce, maintain, or increase the command pressure supplied to the brake cylinder 304 within values comprised between the atmospheric pressure and the braking pressure coming from a conduit 313 connected to the charging solenoid valve 302. The unit 300 may be predisposed to control the pressure to the brake cylinder 304 in open loop, delegating the closure of the control loop to a speed loop according to FIG. 2, or to control said pressure in closed loop through a feedback achieved through the use of a pressure sensor 305.

An electric motor 306 is associated with the axle A able to apply to such axle a traction or braking torque in accordance with a request for torque 307 applied to an inverter 308 that drives said electric motor. The torque to be applied to the axle A by the motor 306 corresponds to a torque request 310, modified by a correction torque 311, variable between zero and the value of the torque 310. The torque 307 is positive in case of traction and negative in case of braking.

A blending module 312, in case of slipping during braking, blends the torque modulation request applied to the axle A between the pneumatic system and the regenerative electrodynamic system, according to a predetermined manner. The torque control apparatus illustrated in FIG. 3 may be realized according to many variants. For example, in the case of hauled railway vehicles, or those satisfying UIC regulations, which typically have pneumatic-type anti-slip systems completely isolated from the traction systems, the unit 300 is not driven by the blending module 312 through a modulation request 313, as is illustrated in FIG. 3, but rather directly by the control module CM of FIG. 2 through a torque modulation request 314 illustrated with a dashed line in FIG. 3. Additionally, while one or more embodiments are described herein in relation to rail vehicles, not all embodiments are limited to rail vehicles. One or more embodiments may be used with other types of vehicles, such as automobiles, trucks, buses, agricultural vehicles, mining vehicles, other off-highway vehicles, etc.

The adhesion coefficient $\mu(\delta)$ between wheels and surfaces of routes, tracks, etc. (e.g., route surfaces) can vary according to the slip $\delta$ substantially in the way illustrated in FIG. 4. Based on the expression (1) above, $\delta$ may be expressed as $$\delta = \frac{Vv - Vr}{Vv} \quad (1')$$

with $0 \leq Vr \leq Vv$ and $0 \leq \delta \leq 1$.

Figure 4:
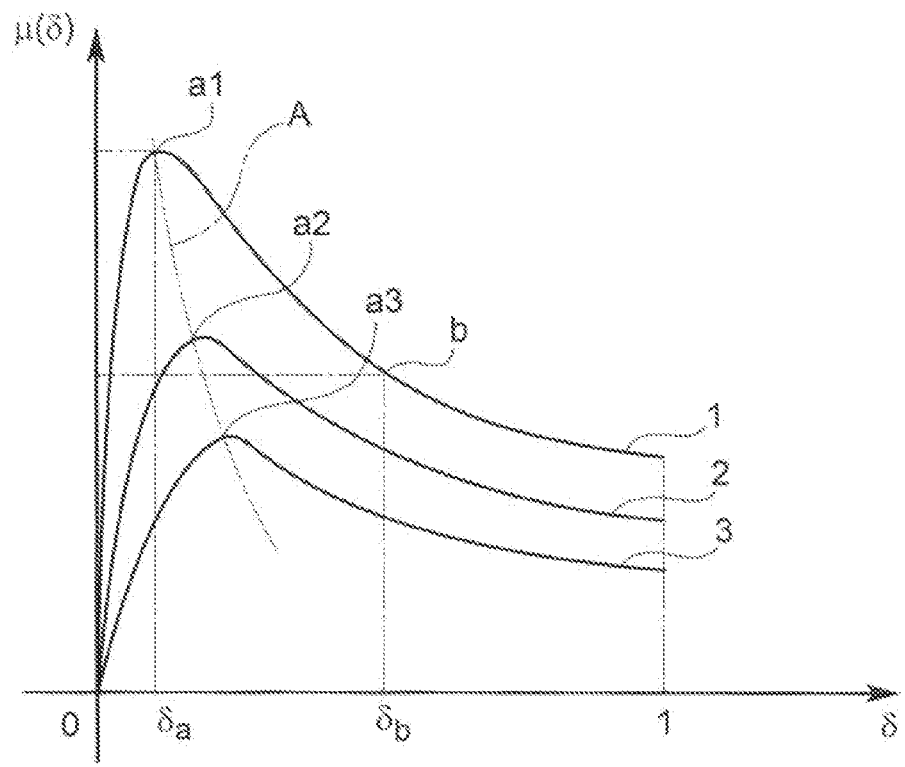
FIG. 4 is a graph showing qualitatively the trend of the adhesion coefficient t of the wheels of an axle, shown on the y-axis, as a function of the slip $\delta$, shown on the x-axis.

In FIG. 4, the curves 1, 2, and 3 qualitatively represent the trend of the adhesion according to the environmental conditions: curve 1 corresponds to an adhesion condition in dry contact conditions between the wheels and route surfaces, curve 2 corresponds to an adhesion condition in the presence of moisture between the wheels and route surfaces, and curve 3 represents an adhesion condition in the presence of viscous material between the wheels and route surfaces, such as oil or rotten leaves (typical condition in the autumn period), or even rust mixed with moisture (typical condition in railway depots, garages, etc.).

It has been found experimentally that the values of $\delta$ at the adhesion peaks a1, a2, a3 change on varying of the adhesion conditions, moving along a curve as indicated with A in FIG. 4.

Figure 5:
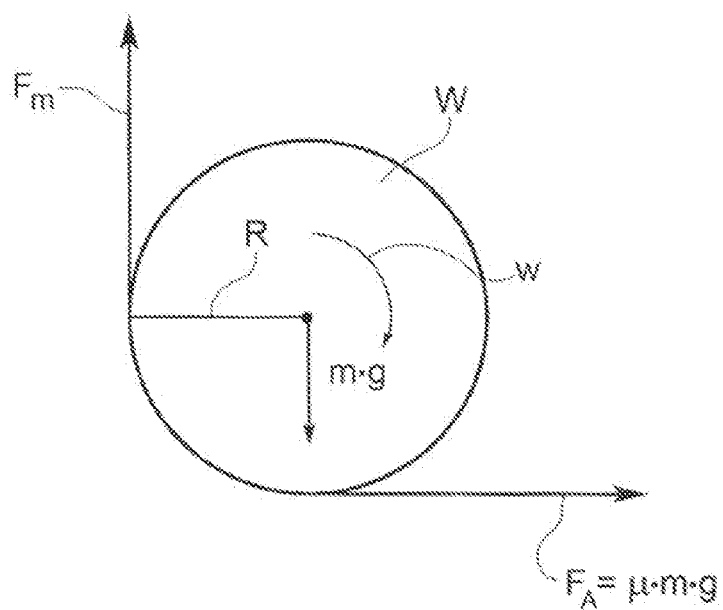
FIG. 5 is a diagram illustrating the forces applied to an axle's wheel.

FIG. 5 is a diagram illustrating forces applied to a wheel of an axle A. From this figure, it is clear that:

$$F_m \cdot R = F_A \cdot R - J \cdot \dot{\omega} \quad (2)$$

where:

$$F_A = \mu \cdot m \cdot g \quad (3)$$

for which:

$$F_m = \mu \cdot m \cdot g - J/R \cdot \dot{\omega} \quad (4)$$

where $F_m$ is the tangential force applied to a wheel by the traction and/or braking system, R is the radius of the wheel, J is the axle's moment of inertia, m is the mass applied to the wheel-rail contact point, ω is the instantaneous angular acceleration of the axle. At the same instantaneous angular acceleration, the maximum applicable force $F_m$ is obtained in correspondence of the maximum adhesion value μ, e.g., in correspondence with the points lying on the curve A of FIG. 4.

If one decides to slip the axle in conditions corresponding for example to point b in FIG. 4, the value of the force $F_m$ available is reduced as a result of the reduction of the adhesion value μ, but an energy injection phenomenon is obtained at the interface between the wheel and the route surface (e.g., the wheel-surface point of contact) proportional to the slip (difference) between the vehicle speed Vv and the tangential speed Vr of the wheel, with a power (energy injected per unit of time):

$$P(\delta)=F_A(\delta)\cdot(V_v-V_r)=\mu(\delta)\cdot m\cdot g\cdot(V_v-V_r)=\mu(\delta)\cdot m\cdot g\cdot \delta V_v, \quad (5)$$

The expression (5) above indicates how by increasing δ an increase of the power applied to the wheel-surface point of contact is obtained. Such injection of energy can cause an overheating of the wheel (e.g., a leading wheel coupled with a leading axle along a direction of travel of the vehicle) with a consequent cleaning effect of the point of contact, improving the instantaneous adhesion value for the next wheel (e.g., a trailing wheel coupled with a trailing axle, traveling over the same portion of the route surface that was traveled by the leading wheel after the leading wheel, and disposed behind the leading wheel and leading axle along a direction of movement of the vehicle). In the case of moisture or rain, significant cleaning effects are obtained, whereas in the presence of lubricants or rotten leaves, the cleaning effect may be less pronounced.

Some systems for recovering adhesion between the wheels and route surfaces impose a fixed slip value δ, typically between 0.2 and 0.3, the specific value being calibrated in a definitive way during the vehicle approval tests. The selected value of δ is therefore optimized for the type of lubricant used to cause the skidding condition during testing, as prescribed for example in EN 15595, :2009+A1, Railway Applications-Braking-Wheel Slide Protection, para. 6.4.2.1. It is therefore not optimal for all types of materials that may cause conditions of slipping during the normal service of the vehicle.

Figure 6A:
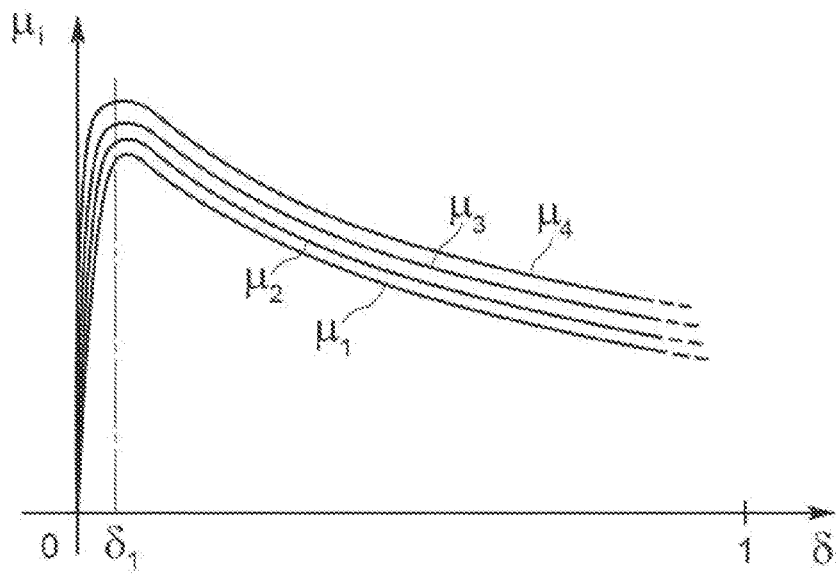
FIGS. 6A, 6B are graphs showing qualitatively the trends of the adhesion coefficient $\mu$ of the wheels of four axles of a vehicle in two different operating conditions.

The graph of FIG. 6A shows in a qualitative way how the global adhesion peak of a vehicle with four axles varies according to the change in δ: by bringing all the axles to slide with adhesion corresponding to the value δ1, as in FIG. 6A, there is practically no cleaning factor, and therefore the four adhesion curves corresponding to the four wheels substantially coincide with each other and each axle takes advantage of the upper limit or maximum adhesion peak value $\mu(\delta_1)$.

Figure 6B:
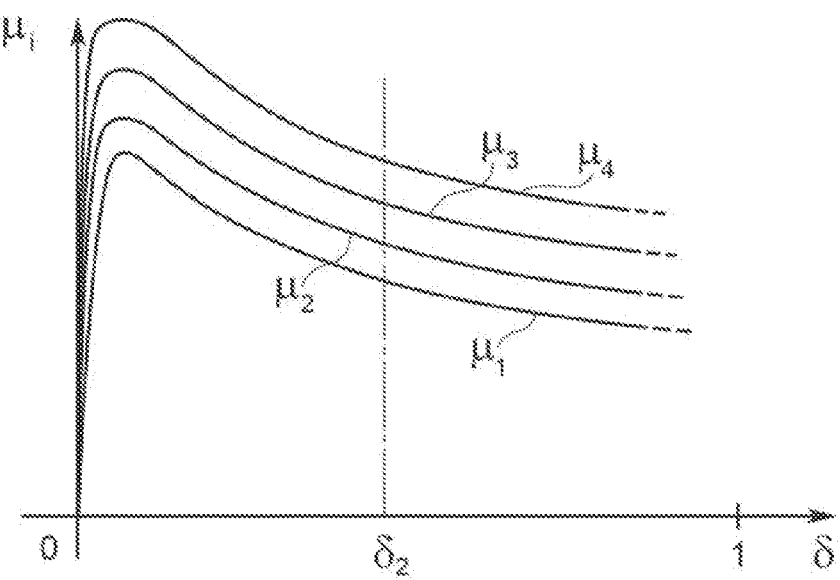

If instead one causes the axles to slide with an adhesion corresponding to the slip $\delta_2$ as in FIG. 6B, a high-cleaning factor will be obtained: only the 1 curve corresponding to the first axle of the vehicle (in the direction of travel) will remain the same and equivalent to that of FIG. 6A, while the curves corresponding to subsequent axles will have increasing adhesion values due to the effect of cleaning achieved by the previous axle. The $\mu(\delta_2)$ value for each axle is lower than the corresponding value of $\mu(\delta_1)$.

Figure 6C:
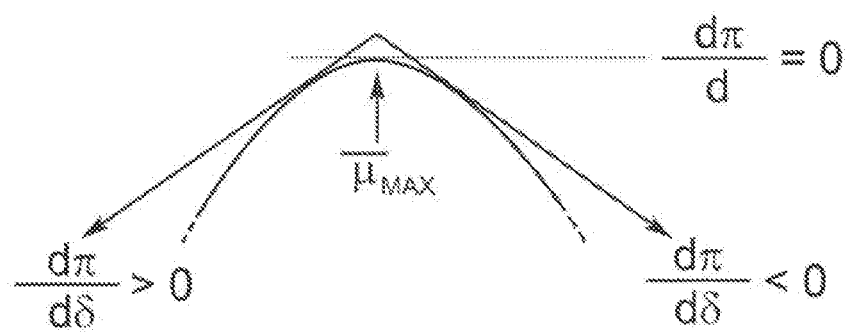
FIG. 6C illustrates the trend of an average adhesion curve $\mu$ around the peak value.

As is qualitatively shown in FIG. 6C, in the range of $\delta_1 \le \delta \le \delta_2$, a peak value of average global adhesion $\bar{\mu}=\Sigma_1^n \mu(\delta)/n$ (6) exists.

What is described above applies, by extension, to a vehicle or convoy with n axles. Since the curves which express the adhesion μ according to the slip function δ cannot be formulated mathematically in an analytical way and vary continuously according to the conditions that cause the skidding, the geometry of the contact point and the external environmental conditions, it may not be possible a priori, to compute analytically the value of δ of optimal slip.

However, a system for controlling and possibly recovering adhesion should be able to analyze the instantaneous adhesion conditions in real time and verify the trend according to the change in δ and identify the value of δ such as to maximize or increase:

$$\bar{\mu}=\Sigma_1^n \mu(\delta)/n.$$

This value is that which allows the maximum or larger recovery of adhesion in case of skidding, e.g., the value that minimizes or reduces the stopping distance in the event of braking in a degraded adhesion condition.

In order to remedy the problems described above, EP 2 147 840 A describes an adaptive control procedure, implemented in discrete mode over time with successive stages, based on the static monitoring of the braking pressure values initially obtained for a δ value equal to 0.7 for a predetermined time, for example 5 seconds. A δ value is then selected from among three possible predetermined values, and this δ value is kept constant at the new value for another predetermined time interval, for example, 10 seconds.

At the end of the total period of 15 seconds, bis returned to the initial value (0.7) and a new monitoring-decision cycle is started. The method described in this document is relatively simple and poses reduced computational requirements to the system. However, it causes jumps in the slip speed corresponding to the jumps in δ, which are liable to cause instantaneous acceleration swings and a high consumption of compressed air.

Moreover, this method allows one to identify variations of δ in the skidding in a discrete mode over time, with a period equal to 15 seconds. Lower periods can be set, but at the expense of a further increased consumption of compressed air and more frequent swings in the instantaneous acceleration. In addition, the continuous repetition of the process may be useless when the environmental conditions do not change substantially during skidding.

WO 2006/113954 A describes a slip control for railway vehicles, implemented in a continuous manner over time, which requires the identification, in optimal adhesion conditions, of the parameters necessary in view of the subsequent desired performance in skidding conditions. This method further requires the global deceleration of the system to be known.

Furthermore, the process of adjusting the optimum slip values requires significantly long times. As this adjustment process is implemented at the beginning of a skid phase, i.e. when the vehicle is traveling at high speed, the space covered by the latter is increased considerably.

One feature of the inventive subject matter provides a method for controlling and possibly recovering the adhesion of the wheels of a controlled axle of a vehicle. The method can include generating speed signals indicative of angular speed(s) of the wheels of at least two axles (which may be controlled axles that are rotated by an engine, motor, or the like), evaluating instantaneous adhesion at the point(s) of contact between the wheels of at least one axle and the route surface using an adhesion observer, generating a target-slip value for the wheels of at least two axles, to be assigned through a predetermined algorithm, which processes the estimated adhesion values, and modifying said target-slip value continuously or repeatedly over time, with a predetermined sampling period, so as to maximize or increase the average value of the adhesion of the wheels of the vehicle.

The method according to one embodiment of the inventive subject matter allows an optimum or calculated value of the slip δ(t) to be identified, which allows the adhesion value obtained as an average value between the instantaneous adhesion of all the axles to be increased or maximized. This average value can be calculated as follows:

$$\bar{\mu}(t)=\Sigma_1^n \mu_n(\delta,t)/n \ i=1,2,\ldots,n \quad (7)$$

The method can intervene at the beginning of a skidding phase and correct the calculated value of δ(t) in real time (e.g., during movement or skidding of the wheels of the vehicle on the route surface) and repeatedly (e.g., continuously, intermittently, etc.) over time, adapting the calculated value of δ(t) (e.g., slip as a function of time) to possible variations of the values $\mu_i(\delta,t)$ (adhesions of the i controlled axles) which may intervene in the course of skidding so as to tend to maintain the average value μ(t) in all or many circumstances at the increased or maximum value.

The method can use an adhesion observer to evaluate in real time the adhesion value μ at the point of contact between the wheels and route surface(s) for one or more axles during a skidding phase and, by processing these μ values in real time, identify repeatedly over time the optimal or defined δ value to be assigned to a slip control system to obtain the greatest or increased global adhesion recovery.

An adhesion observer adapted to dynamically identify the instantaneous value ($T_j$) of the adhesion in a generic sampling period $T_j$ of a predetermined duration T at the wheel-route point of contact during skidding is definable using the equations provided above, from which with some steps the following relationship is obtained:

$$\mu(T_j) = \frac{1}{m \cdot g} \cdot [F_m(T_j) + J/R \cdot \dot{\omega}(T_j)] \quad (8)$$

where $\dot{\omega}$ is the angular acceleration of the axle (e.g., the time derivative of the angular speed of the axle. The value of this acceleration may be available in real time within a control and adhesion recovery system, because angular acceleration is one of the variables on which the control function implemented by the block CM in FIG. 2 is normally based for achieving the slip control of the axle. The sign of $\dot{\omega}$ depends on the instantaneous acceleration or deceleration condition of the axle); m is the mass on the wheel-route point of contact (in some vehicle systems, the value of m may be known in real time, as this value may already be available to the system that computes the accelerating/braking force to apply to the axle to obtain the desired accelerations/decelerations); J is the moment of inertia of the axle and may have a value that is designated or always known (e.g., supplied by the manufacturer of the carriages and/or otherwise known from the for the computation of stopping distances); $F_m$, already defined above in relation to FIG. 5 (can be obtained by multiplying the pressure applied to a brake cylinder, which may be known to the braking system, for pressure/force conversion coefficients typical of the brake cylinder, as well as the transmission and efficiency coefficients of the levers and of the coefficient of the friction between the brake linings and discs (in the case of disc brakes); in the case of electrodynamic type traction or braking, the value of the force $F_m$ may be obtained from the electric current value supplied/regenerated by the motor in traction or, respectively, in braking; in the case of so-called "blended" braking, the intensity of the force $F_m$ may be determined as the sum of the respective contributions of the pneumatic brake and of the electrodynamic brake, appropriately weighed with respective coefficients); and $T_j$ is the generic $j^{th}$ value for the sampling period of the system with which the adhesion observer and more generally the method according to one embodiment of the invention; in the description that follows, $T_j$ will replace the use of the variable t representing time.

Figure 7:
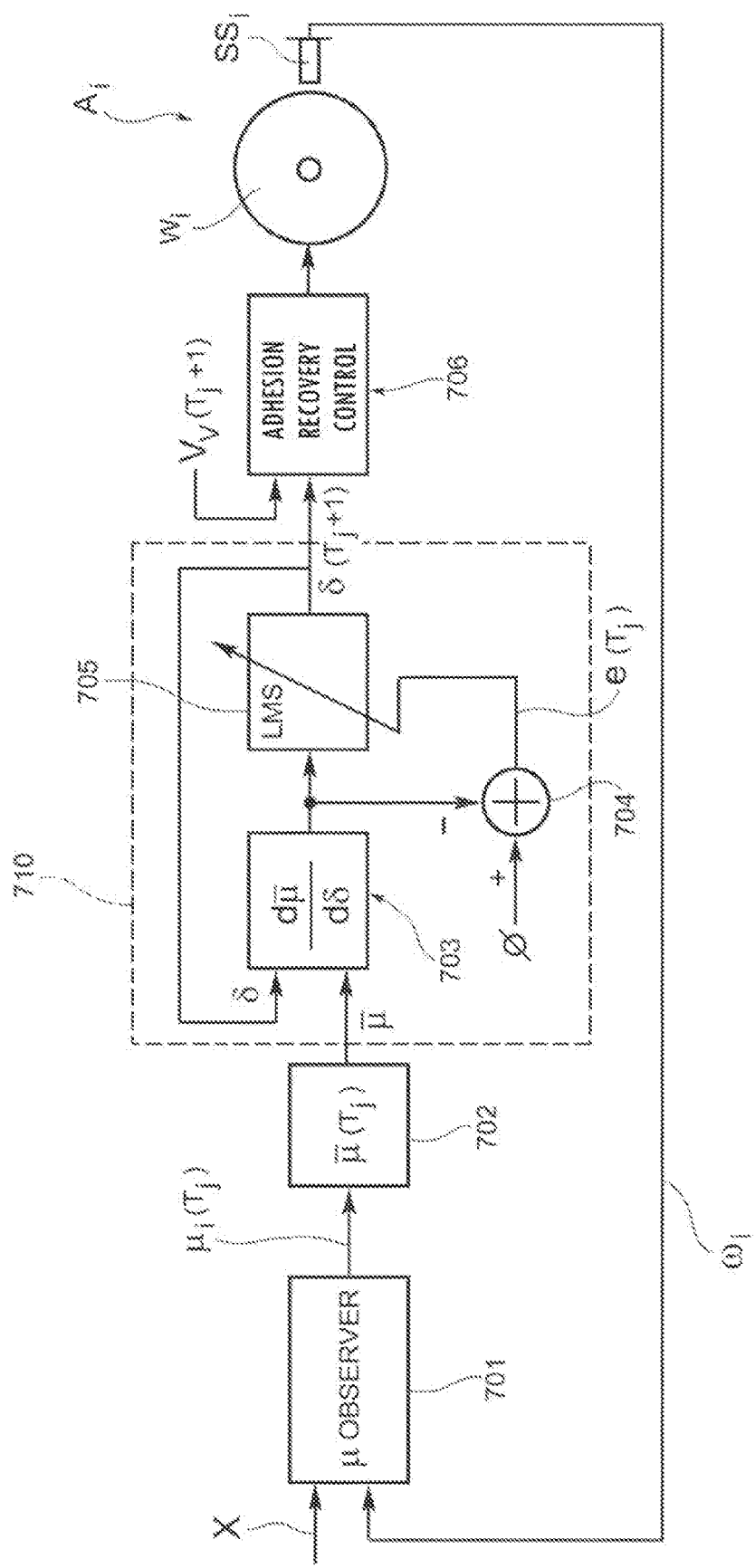
FIG. 7 is a block diagram of a system for implementing a method according to the inventive subject matter.

Downstream of the adhesion observer (via a path that information and/or signals are communicated), a low-pass type filter can be used to remove or at least mitigate instantaneous or short term variations and noise present outside of the frequency band useful for a correct observation of the adhesion values. A first embodiment of a vehicle control system for implementing a method according to the inventive subject matter is illustrated in FIG. 7.

The system and method can identify and track and tracking the slip value δ such that the curve μ(δ) illustrated in FIG. 6C presents an increased or maximum value, such as the value of δ for which:

$$\frac{d\bar{\mu}(T)}{d\delta(T)} = (0)$$

For this purpose, a system implementing an LMS algorithm (Least Mean Square) may be used. For an accurate description of the general characteristics of the convergence criteria and the implementation variants of one or more LMS algorithms, please refer to the available literature and in particular to the text: B. Widrow, S. D. Stearns, "Adaptive Signal Processing", New Jersey, Prentice-Hall, Inc., 1985.

With reference to FIG. 7, an adhesion observer 701 receives input signals representative of the speed values of $\omega_1, \omega_2, \ldots, \omega_n$ of the wheels $W_1, W_2, \ldots, W_n$ of controlled axles A1, A2, ..., An, together with a vector containing the values of the magnitudes $m_i(T_j)$, $J_i$, $R_i$ and $F_{mi}(T_j)$ previously described for the estimation of the instantaneous adhesion values of $\mu_i(T_j)$ relating to the axles $A_i$ (with i=1, 2, ..., n). The adhesion observer can represent hardware circuitry that includes and/or is connected with one or more processors (e.g., one or more microprocessors, field programmable gate arrays, integrated circuits, etc.) that perform the operations described herein in connection with the adhesion observer.

The output of the adhesion observer 701 is connected to the input of a calculation module or device 702 which computes, based on the estimated instantaneous adhesions values $\mu_i(T_j)$, the average value $\mu(T_j)$. The modules described herein can represent hardware circuitry that includes and/or is connected with one or more processors that perform the operations described herein in connection with the calculation module or device. This hardware circuitry and/or processors for each module may be the same or different circuitry and/or processors than the other modules and/or the adhesion observer.

A subsequent differentiator module 703 computes the value of $$\frac{d\mu}{d\delta},$$

for example, according to the equation:

$$\frac{d\bar{\mu}(T_j)}{d\delta(T_j)} = \frac{\bar{\mu}(T_j) - \bar{\mu}(T_{j-1})}{\delta(T_j) - \delta(T_{j-1})} \quad (9)$$

An adder module or device 704 outputs the error $e(T_j)$ as the difference between the desired value (0) of the derivative and the instantaneous value corresponding to the equation (9) above. The error $e(T_j)$ is used to drive and adapt the LMS algorithm implemented in an implementation module 705. This implementation module outputs the target value $\delta(T_j+1)$.

The value $\delta(T_j+1)$ is supplied, together with the updated value of the speed $V_v$ of the vehicle, to a plurality of adhesion recovery control devices 706, one for each axle $A_i$, each having, for example, the architecture illustrated in FIG. 2 described above. The implementation module 705 that implements the LMS algorithm continuously implements the correction of the output (e.g., the $\delta$ value, in order to minimize, reduce, or cancel the error $e(T)$, i.e. up to the cancellation of $$\frac{d\bar{\mu}}{d\delta}.$$

Figure 8:
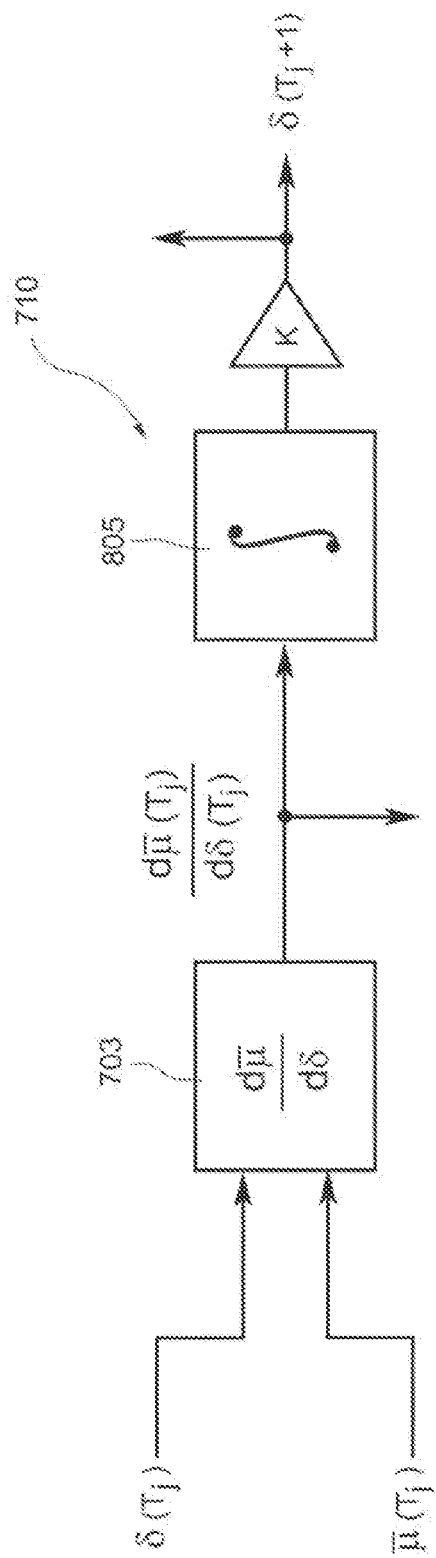
FIGS. 8 and 9 are block diagrams of two alternative embodiments of systems for continuously tracking the average adhesion peak value.

A simplified implementation of the group of modules included in the dashed line block 710 of FIG. 7 is illustrated in FIG. 8, where the implementation module 705, which implements the LMS algorithm, is replaced with a simple integrator module 805, the output of which, amplified with a gain K, generates the target-slip value $\delta(T_j+1)$ to be assigned to the adhesion control and recovery system 706 (shown in FIG. 7). The gain K regulates the identification speed of the average adhesion peak value f and can ensure the stability of the closed loop system.

Figure 9:
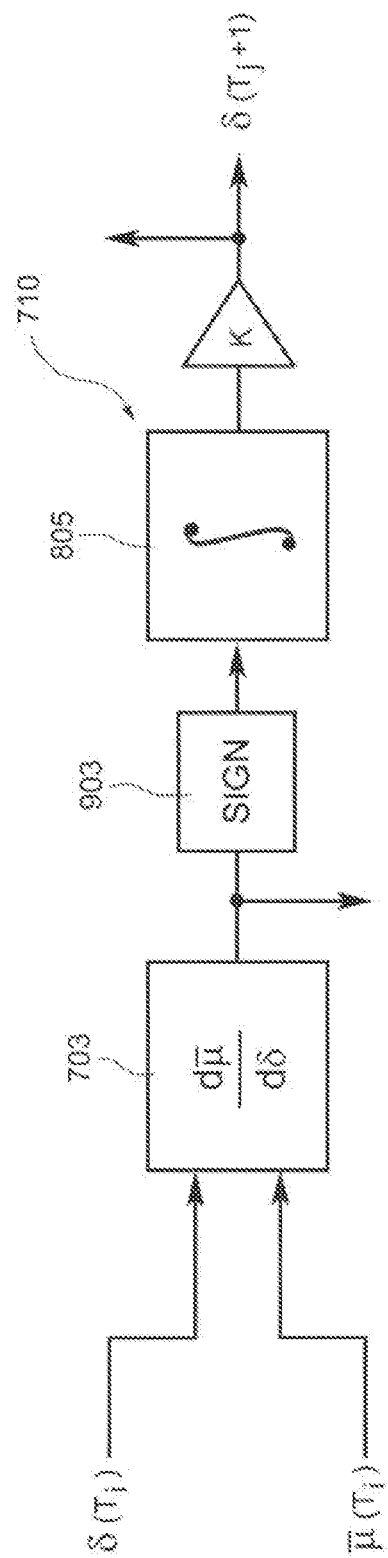

Another variant of embodiment of the dashed block 710 of FIG. 7 is shown in FIG. 9: a detection module 903 detects the sign of the derivative $$\frac{d\bar{\mu}}{d\delta}.$$

The output of the module 903 being equal to +1 or −1 (the positive and, respectively, negative direction), a subsequent integrator module 805 performs simple unitary sums. The integrator 805 may be replaced with an up/down type counter updated with period $T=T_{j+1}-T_j$.

The diagrams according to FIGS. 8 and 9 perform a continuous tracking of the average adhesion peak $\mu$, continuously adapting to the change in adhesion conditions, similarly to what was achieved with the diagram according to FIG. 7. The latter allows rapid and accurate tracking of the condition $$\frac{d\bar{\mu}}{d\delta} = 0,$$

but may require the use of a certain number of computations in real time.

The diagram according to FIG. 9 greatly reduces the number of computations necessary, but also reduces the speed of tracking the condition $$\frac{d\bar{\mu}}{d\delta} = 0.$$

The diagram according to FIG. 8 has intermediate characteristics between those of the diagrams according to FIGS. 7 and 9.

Figure 10:
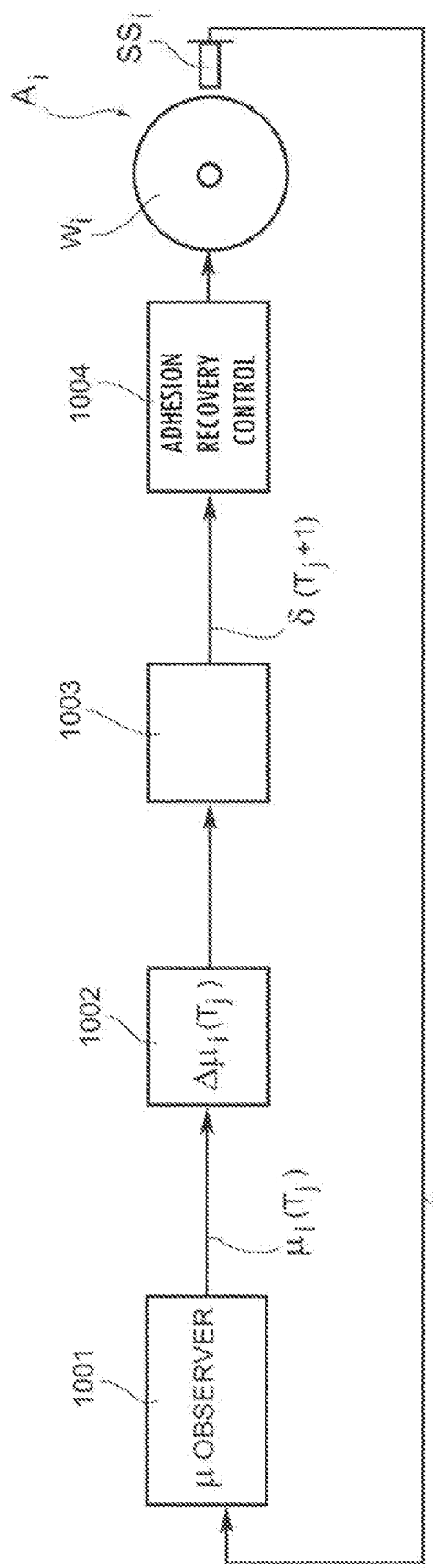
FIG. 10 is a block diagram of another system for implementing a process or method according to the inventive subject matter.

FIG. 10 illustrates a further vehicle control system for the implementation of a method according to the inventive subject matter, where the difference between the greater and lesser adhesion value between the controlled axles in the generic period $T_j$ is analyzed in real time:

$$\Delta\mu(T_j) = \mu_{max}(T_j) - \mu_{min}(T_j) \quad (10)$$

and the value $\delta(T_j+1)$ is obtained on the basis of a curve obtained from experimental data, as described below.

With reference to FIG. 10, an adhesion observer or module 1001, similar to the observer or module 701 of FIG. 7, receives the values of the speeds $\omega_i$ of the wheels $W_i$ of controlled axles $A_i$, together with a vector of the values of the magnitudes previously described, necessary for the estimation of the corresponding adhesions $\mu_i(T_j)$. A differential module 1002 receives from the adhesion observer 1001 the values of the instantaneous adhesions $\mu_i(T_j)$ and outputs the value of $\Delta\mu(T_j)$, according to the equation (10) given above in one example.

A slip calculation module 1003 subsequently receives the value of $\Delta\mu(T_j)$ as input and outputs the value of $\delta(T_j+1)$ to be assigned to the control and adhesion recovery module 1004, similar to the module 706 of FIG. 7 and having, for example, the configuration shown in FIG. 2.

The calculation module 1003 may have a transfer function with hysteresis according to the graph shown in FIG. 11: this transfer function defines a relationship between the slip $\delta$ and the adhesion variation $\Delta\mu$, the graph of which has essentially the shape of a polygon, bounded below by a straight horizontal line, $\delta=\delta x$ with $\delta x$ typically (but not necessarily) equal to 0.05 and bounded above by a horizontal straight line, $\delta=\delta y$, with $\delta y$ typically (but not necessarily) equal to 0.35. The transfer function can thus generate $\delta$ values between $\delta x$ and $\delta y$.

If the adhesion control and recovery module 1004 must fully comply with regulatory requirements (EN 15595, :2009+A1, cited above), then the $\delta y$ value may abide by the requirements in paragraph 6.3.2.2 of that standard.

If during a sliding phase for a given $\delta$ value, a reduction of adhesion $\Delta\mu$ is observed tending to cause the point of work to migrate out horizontally through the left oblique rectilinear side of the aforementioned polygon, the transfer function will determine the new value of $\delta(\Delta\mu)$ descending along this oblique rectilinear side. Similarly, if, during a skidding phase for a given $\delta$ value, there is an increase of $\Delta\mu$ tending to cause the point of work to migrate out horizontally through the right oblique side of the polygon, the transfer function will determine the new value of $\delta(\Delta\mu)$ rising along the right oblique rectilinear side of the aforementioned polygon.

The hysteresis of the transfer function is required to provide stability to the system, which otherwise would tend to oscillate due to the significant propagation delay in the loop.

The oblique rectilinear sides of the polygon converge between them toward the bottom, reducing the hysteresis in the vicinity of the origin of the coordinate axes, in order to make the system very sensitive to small variations of $\Delta\mu$ when the system is to work in conditions of $\delta \approx \delta x$, as in the situation to which the graph of FIG. 6A refers.

Figure 11:
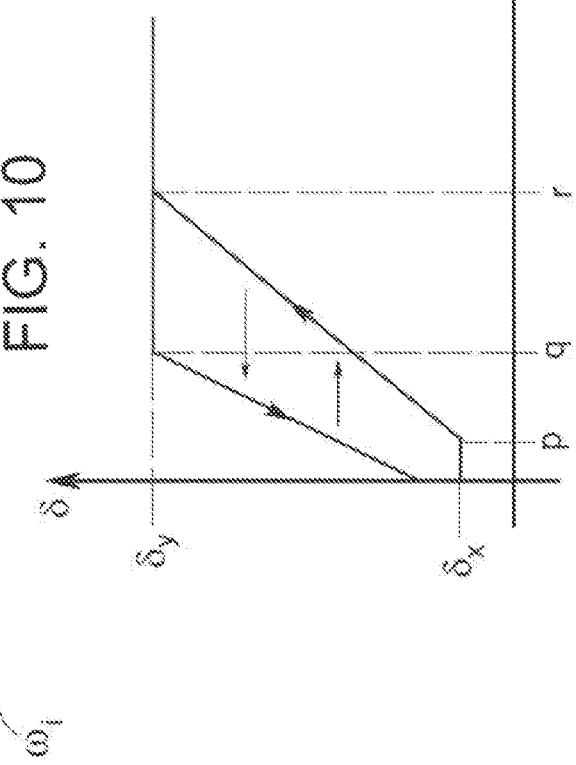
FIG. 11 is a graph of a transfer function with hysteresis used in the implementation of the system and/or method according to the inventive subject matter.

In FIG. 11, the values p, q, r, which represent the x-coordinates of vertices of the aforementioned polygon, are determined experimentally and have, for example, approximately the values p=0.01, q=0.03 and r=0.05. The module 1003 computes $\delta(T_j+1)$ with a period T $(=T_{j+1}-T_j)$, ensuring an adjustment in time of the $\delta$ value to the environmental conditions.

A further implementation of the method according to the inventive subject matter may provide for the generation of the value of $\delta(T_j)$ according to a real-time processing of the values of $\mu(T_j)$, $\Delta\mu(T_j)$ and $\delta(T_j)$) by means of a fuzzy logic algorithm, intended to generate the value of $\delta(T_{j+1})$ to be assigned to the adhesion control/recovery module 706 of FIG. 7.

A manner of implementing the method according to the inventive subject matter described above in skidding phase can force all the controlled axles to slip about the value $\delta$. In fact, the last (in the direction of travel) of the controlled axles that is still in the skidding condition, no longer having the function of cleaning the route surface (e.g., rails) for any subsequent axles (since it is the last of the axles, or further subsequent axles being in the condition of complete adhesion) may be held in controlled slipping on the adhesion peak value lying on the curve A of FIG. 4 by further increasing the value of $\mu(T_j)$.

Such action simply may not be done by forcing on the concerned axle a specific value of $\delta$ corresponding to the points of the curve A of FIG. 4, since this curve is unknown a priori and varies continuously with time.

Figure 12:
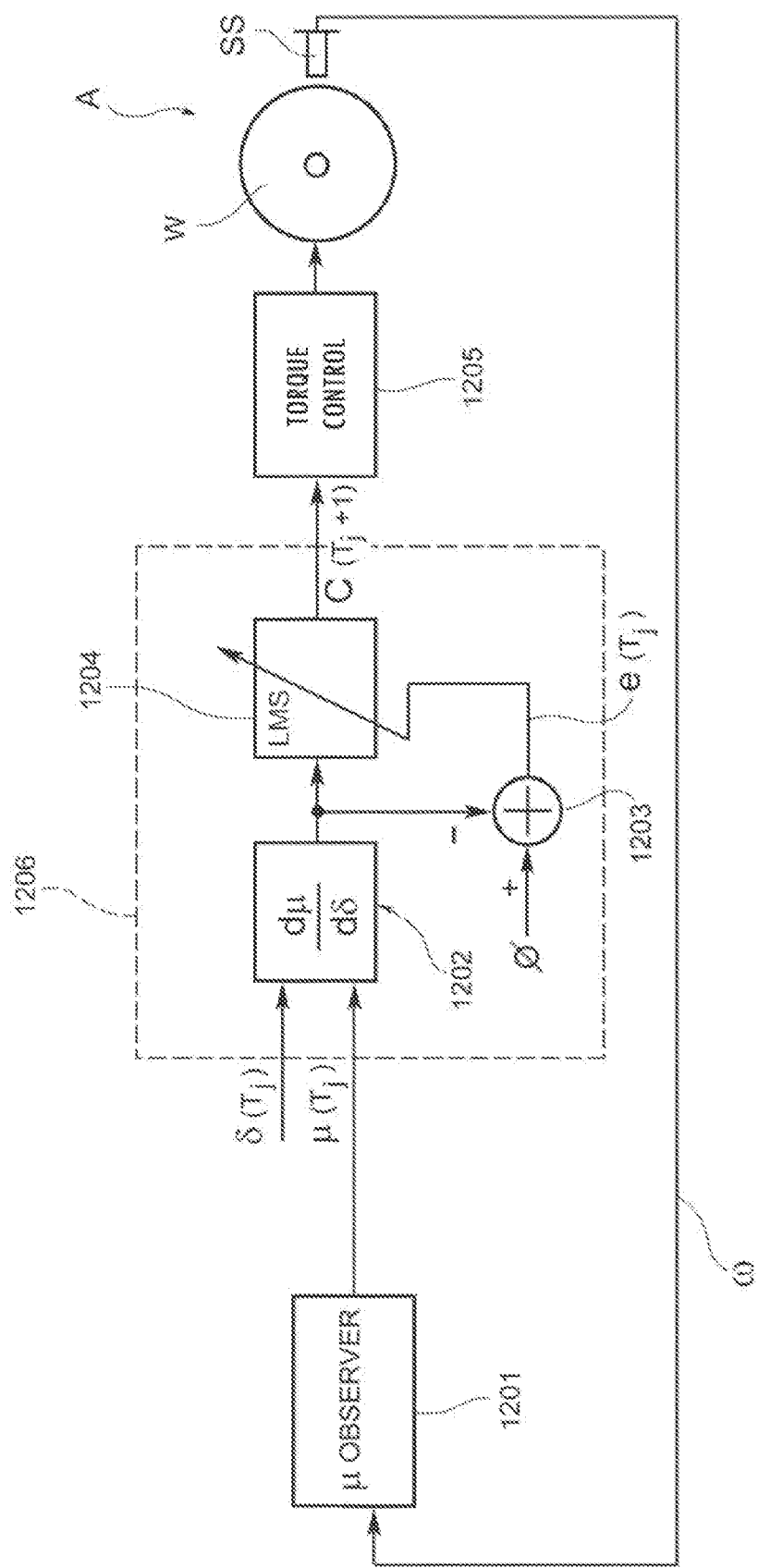
FIG. 12 is a block diagram of a variant of embodiment of a system for implementing a method according to the inventive subject matter.

To maintain this axle in controlled slipping on the adhesion peak value, as is shown in FIG. 12, an adhesion observer module 1201 receives signals indicative of the wheel speed W of this controlled axle, simultaneously or concurrently with a value vector of the magnitudes, previously described, necessary for estimating the instantaneous adhesion $\mu$ of this axle.

A derivative module 1202 subsequently computes the value of the derivative $$\frac{d\mu}{d\delta},$$

when the value of $\delta$ is obtained in real time in accordance with the equation (1').

An adder device or module 1203 outputs the error $e(T_j)$ as the difference between the desired value of said derivative (i.e., the value 0) and the instantaneous value computed by the module 1202. This error is used to adapt the LMS algorithm implemented in a block 1204. The latter outputs a torque request $C(T_{j+1})$ for said axle, which is transmitted to a torque control module 1205, having, for example, the architecture described above with reference to FIG. 3.

In one example, the module 1204 can repeatedly (e.g., continuously or intermittently) correct the output $C(T_{j+1})$ to minimize, reduce, or cancel the error $e(T)$ (e.g., to obtain a cancellation of the aforementioned derivative, that is in order to bring the axle to the adhesion peak value and maintain the axle at that value).

The dashed block 1206 of FIG. 12 may possibly be simplified as described above in relation to FIG. 7 and the relative simplifying variants illustrated in FIGS. 8 and 9. The solution according to FIG. 12 allows the real value of the maximum or larger value available adhesion for a given axle to be measured. By applying this solution to two axles, for example, the first axle in the direction of travel and the last axle in the skidding condition, and finding the difference between their adhesions, the value to be assigned as the difference in adhesion $\Delta\mu$ in the embodiment illustrated in FIG. 10 may be obtained, in substitution of the blocks 1001 and 1002 illustrated herein.

The solution according to FIG. 12 may also be used to identify the direction of travel of the vehicle: at the beginning of a skidding phase, the solution according to FIG. 12 is applied for example to the first and last axles of the vehicle and the direction of travel is defined by the axle for which the lower value of adhesion is detected.

Finally, the solution according to FIG. 12 may be used to improve the estimation of the actual speed $V_v$ of the vehicle. The curve A of FIG. 4 is located in a field to which correspond the x-axis values $\delta$ of less than 0.02. The algorithm most used for the estimation of the actual speed $V_v$ of the vehicle, in the event of braking, may use a function of the type:

$$V_v(T_j)=\max [S_1(T_j), \ldots, S_n(T_j), (V_v(T_{j-1})+a_{max}\cdot T)] \quad (11)$$

while in the case of traction, the following function can be used:

$$V_v(T_j)=\min [S_1(T_j), \ldots, S_n(T_j), (V_v(T_{j-1})+a_{max}\cdot T)] \quad (12)$$

where $a_{max}$ can be the maximum (or other designated upper limit) acceleration permitted for the vehicle in operation, this acceleration having a positive sign in the case of a traction condition and a negative sign in the case of a braking condition.

Therefore, applying the solution according to FIG. 12 to at least one axle, the axle may advance at a linear speed equal to that of the vehicle (or less than a maximum error computable as 2%), even in degraded adhesion conditions. Therefore, the above two expressions can allow for a reliable value of the vehicle's speed $V_v$ to be provided, even in very degraded adhesion conditions.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

The vehicle control system can control the adhesion of the wheels to the route surface using the target slip values that are determined (e.g., in real time, or as the vehicle moves along the route). The ECU of the vehicle control system can determine the angular speeds of the wheels, determine the instantaneous adhesion of the wheels to the route surface, generate a target slip value, and then control the torque applied to the wheels via the axles (e.g., by an engine and/or motor) based on the target slip value to increase or maximize adhesion of the wheels to the route surface. For example, as the target slip value decreases for a wheel or axle, the ECU can automatically decrease the torque applied to the wheel(s) coupled with that axle. As another example, as the target slip value increases for a wheel or axle, the ECU can automatically increase the torque applied to the wheel(s) coupled with that axle.

In one embodiment, a vehicle control system is provided for controlling adhesion of wheels to a route surface. The control system includes one or more processors configured to determine adhesion values representative of adhesion between the wheels of a vehicle and the route surface based on angular speeds of the wheels. The one or more processors are configured to generate a target slip value for the wheels that are coupled with at least two different axles of the vehicle by processing the adhesion values and modifying the target slip value continuously in time to maximize an average value of the adhesion values of the wheels. The one or more processors also are configured to control a torque applied to at least one of the axles based on the target slip value. The continuous change to the target slip value can include repeatedly changing the target slip value based on a sampling time of the system such that one or more intervals of time may exist between changes to the target slip value. The average value of the adhesion values can be maximized by increasing the average value to a designated or upper limit, where this limit can be less than a theoretical or maximum potential adhesion. For example, the maximized average value of adhesion may be an adhesion value that prevents the wheels from slipping but is less than a largest possible value of adhesion.

Optionally, the one or more processors are configured to control and change the torque applied to the at least one of the axles to reduce a derivative of an average value of the adhesion values with respect to the target slip value.

Optionally, the one or more processors are configured to determine an integral of the derivative of the average value of the adhesion values with respect to the target slip value, the one or more processors configured to determine or change the target slip value based on the integral that is determined.

Optionally, the at least two different axles include a leading axle and a trailing axle along a direction of movement of the vehicle. The one or more processors can be configured to increase the target slip value associated with the leading axle to clean the route surface with at least one of the wheels coupled with the leading axle prior to travel of at least another one of the wheels that is coupled with the trailing axle.

Optionally, the one or more processors are configured to increase the adhesion value for the at least another one of the wheels by increasing the target slip value associated with the leading axle.

Optionally, the one or more processors also are configured to repeatedly change the torque applied to the at least one of the axles based on the target slip value that changes.

Optionally, the one or more processors are configured to determine an average value of the adhesion between the wheels and the route surface using the adhesion values.

A method for controlling adhesion of wheels of a vehicle includes determining adhesion values representative of adhesion between wheels of a vehicle and a route surface based on angular speeds of the wheels and determining a target slip value for the wheels that are coupled with at least two different axles of the vehicle. The target slip value is determined based on the adhesion values that is determined. The method also includes controlling a torque applied to at least one of the axles based on the target slip value and continuously changing the target slip value as the vehicle moves based on changes in the adhesion values to maximize an average value of the adhesion values. The continuous change to the target slip value can include repeatedly changing the target slip value based on a sampling time of the system such that one or more intervals of time may exist between changes to the target slip value. The average value of the adhesion values can be maximized by increasing the average value to a designated or upper limit, where this limit can be less than a theoretical or maximum potential adhesion. For example, the maximized average value of adhesion may be an adhesion value that prevents the wheels from slipping but is less than a largest possible value of adhesion.

Optionally, the torque applied to the at least one of the axles is controlled to reduce a derivative of an average value of the adhesion value with respect to the target slip value.

Optionally, the method also includes determining an integral of the derivative of the average value of the adhesion value with respect to the target slip value. The target slip value can be changed based on the integral that is determined.

Optionally, the at least two different axles include a leading axle and a trailing axle along a direction of movement of the vehicle. Changing the target slip value can include increasing the target slip value associated with the leading axle to clean the route surface with at least one of the wheels coupled with the leading axle prior to travel of at least another one of the wheels that is coupled with the trailing axle.

Optionally, the method also includes increasing the adhesion value for the at least another one of the wheels by increasing the target slip value associated with the leading axle.

Optionally, controlling the torque includes repeatedly changing the torque applied to the at least one of the axles based on the target slip value that changes.

Optionally, the adhesion value is determined as an average value of the adhesion between the wheels and the route surface as the adhesion value.

A system for controlling adhesion of wheels of a vehicle includes one or more processors configured to determine adhesion values representative of adhesion between wheels of a vehicle and a route surface based on angular speeds of the wheels. The one or more processors are configured to determine a target slip value for the wheels that are coupled with at least two different axles of the vehicle. The one or more processors are configured to determine the target slip value based on the adhesion values that is determined. The one or more processors are configured to control a torque applied to at least one of the axles based on the target slip value and to continuously change the target slip value as the vehicle moves based on changes in the adhesion values to maximize an average value of the adhesion values. The wheels include a leading wheel and a trailing wheel along a direction of movement of the vehicle. The one or more processors are configured to increase the target slip value associated with the leading wheel to clean the route surface with the leading wheel prior to travel of the trailing wheel.

Optionally, the one or more processors are configured to control and change the torque applied to the at least one of the axles to reduce a derivative of the average value of the adhesion values with respect to the target slip value.

Optionally, the one or more processors are configured to determine an integral of the derivative of the average value of the adhesion values with respect to the target slip value. The one or more processors can be configured to determine or change the target slip value based on the integral that is determined.

Optionally, the one or more processors are configured to increase the adhesion value for the trailing by increasing the target slip value associated with the leading wheel.

Optionally, the one or more processors also are configured to repeatedly change the torque applied to the at least one of the axles based on the target slip value that changes.

Optionally, the vehicle is a railway vehicle.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A vehicle control system comprising:
   one or more processors configured to determine adhesion values representative of adhesion between wheels of a vehicle and a route surface based on angular speeds of the wheels,
   the one or more processors configured to subsequently calculate a target slip value for the wheels that are coupled with at least two different axles of the vehicle using the adhesion values that were determined, the one or more processors also configured to repeatedly modify the target slip value to increase an average value of the adhesion values of the wheels,
   the one or more processors configured to control a torque applied to at least one of the axles based on the target slip value that is calculated.

2. The vehicle control system of claim 1, wherein the one or more processors are configured to reduce a derivative of the average adhesion value with respect to the target slip value by changing the torque applied to the at least one of the axles.

3. The vehicle control system of claim 2, wherein the one or more processors are configured to determine an integral of the derivative of the average value of the adhesion values with respect to the target slip value, the one or more processors configured to determine or change the target slip value based on the integral that is determined.

4. The vehicle control system of claim 1, wherein the at least two different axles include a leading axle and a trailing axle along a direction of movement of the vehicle, the one or more processors are configured to increase the target slip value associated with the leading axle to clean the route surface with at least one of the wheels coupled with the leading axle prior to travel of at least another one of the wheels that is coupled with the trailing axle.

5. The vehicle control system of claim 4, wherein the one or more processors are configured to increase the adhesion value for the at least another one of the wheels by increasing the target slip value associated with the leading axle.

6. The vehicle control system of claim 1, wherein the one or more processors also are configured to repeatedly change the torque applied to the at least one of the axles based on the target slip value that changes.

7. The vehicle control system of claim 1, wherein the one or more processors are configured to determine an average value of the adhesion between the wheels and the route surface using the adhesion values.

8. A method comprising:
    determining adhesion values representative of adhesion between wheels of a vehicle and a route surface based on angular speeds of the wheels;
    calculating a target slip value for the wheels that are coupled with at least two different axles of the vehicle, the target slip value calculated using the adhesion values that were determined;
    controlling a torque applied to at least one of the axles based on the target slip value; and
    repeatedly changing the target slip value as the vehicle moves based on changes in the adhesion values to increase an average value of the adhesion values.

9. The method of claim 8, further comprising reducing a derivative of an average value of the adhesion value with respect to the target slip value by changing the torque applied to the at least one of the axles.

10. The method of claim 9, further comprising:
    determining an integral of the derivative of the average value of the adhesion value with respect to the target slip value, wherein the target slip value is changed based on the integral that is determined.

11. The method of claim 8, wherein the at least two different axles include a leading axle and a trailing axle along a direction of movement of the vehicle, and changing the target slip value includes increasing the target slip value associated with the leading axle to clean the route surface with at least one of the wheels coupled with the leading axle prior to travel of at least another one of the wheels that is coupled with the trailing axle.

12. The method of claim 11, further comprising:
    increasing the adhesion value for the at least another one of the wheels by increasing the target slip value associated with the leading axle.

13. The method of claim 8, wherein controlling the torque includes repeatedly changing the torque applied to the at least one of the axles based on the target slip value that changes.

14. The method of claim 8, wherein the adhesion value is determined as an average value of the adhesion between the wheels and the route surface as the adhesion value.

15. A system comprising:
    one or more processors configured to determine adhesion values representative of adhesion between wheels of a vehicle and a route surface based on angular speeds of the wheels,
    the one or more processors configured to subsequently calculated a target slip value for the wheels that are coupled with at least two different axles of the vehicle using the adhesion values that were determined,
    the one or more processors configured to control a torque applied to at least one of the axles based on the target slip value and to repeatedly change the target slip value as the vehicle moves based on changes in the adhesion values to increase an average value of the adhesion values,
    wherein the wheels include a leading wheel and a trailing wheel along a direction of movement of the vehicle, the one or more processors are configured to increase the target slip value that is calculated associated with the leading wheel to clean the route surface with the leading wheel prior to travel of the trailing wheel.

16. The system of claim 15, wherein the one or more processors are configured reduce a derivative of the average value of the adhesion values with respect to the target slip value by changing the torque applied to the at least one of the axles.

17. The system of claim 16, wherein the one or more processors are configured to determine an integral of the derivative of the average value of the adhesion values with respect to the target slip value, the one or more processors configured to determine or change the target slip value based on the integral that is determined.

18. The system of claim 15, wherein the one or more processors are configured to increase the adhesion value for the trailing by increasing the target slip value associated with the leading wheel.

19. The system of claim 15, wherein the one or more processors also are configured to repeatedly change the torque applied to the at least one of the axles based on the target slip value that changes.

20. The system of claim 15, further comprising a low-pass filter configured to reduce noise present outside a useful frequency band when determining the adhesion value.

* * * * *